(No Model.)
J. N. BROWN.
VEHICLE WHEEL.
No. 438,468. Patented Oct. 14, 1890.
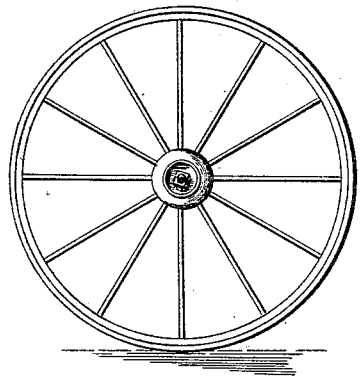
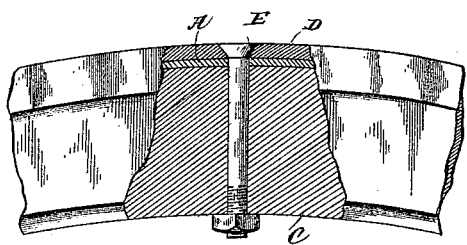
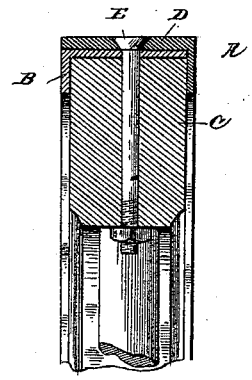
Witnesses
Paul W. Stevens.
Therean Myers
Inventor
John N. Brown
By Myers & Co
Attorneys

UNITED STATES PATENT OFFICE.

JOHN N. BROWN, OF NEW LONDON, CONNECTICUT.

VEHICLE-WHEEL.

SPECIFICATION forming part of Letters Patent No. 438,468, dated October 14, 1890.

Application filed March 1, 1890. Serial No. 342,203. (No model.)

*To all whom it may concern:*

Be it known that I, JOHN N. BROWN, a citizen of the United States of America, residing at New London, in the county of New London and State of Connecticut, have invented certain new and useful Improvements in Vehicle-Wheels, of which the following is a specification, reference being had therein to the accompanying drawings.

My invention pertains to an improvement in vehicle-wheels; and it consists in the novel construction, combination, and arrangement of the tire and felly thereof, substantially as hereinafter more fully shown and described.

In the accompanying drawings, Figure 1 is a side elevation of a wheel, showing my tire as applied thereto. Fig. 2 is a detail view of my invention as applied to the wheel, parts being broken away and in section; and Fig 3 is a cross-sectional view of the same.

The object of my improvement is not only to produce in all respects a more perfect and efficient vehicle-wheel, but one so constructed as to prevent the felly from splitting and the tire after long or short usage from becoming disconnected from the felly or wheel either by shrinkage or disconnection of any of the parts thereof.

In constructing my tire I first in any ordinary manner fashion out a thin tire A with one edge turned down, as shown at B, and it will be observed that thus constructed it may be readily secured upon felly C. Tire D is also formed with one edge turned down in a manner similar to tire A, and it is then fitted upon tire A, as shown. Thus constructed and arranged the felly is securely clamped and is prevented from splitting, as the inner tire so closely clamps the felly that it holds it rigidly in place, the tire being bolted or screwed to the felly by transverse nutted bolts or screws E, spaced apart, which project through both sections of the tire, the heads thereof being countersunk, as shown.

Having thus fully described my invention, what I claim, and desire to secure by Letters Patent, is—

In a vehicle-wheel, the combination of the approximately inverted-L-shaped tires of different diameters, and having their horizontal ends lapped over the felly and their vertical ends projected down on opposite sides thereof, substantially as shown and described.

In testimony whereof I affix my signature in the presence of two witnesses.

JOHN N. BROWN.

Witnesses:
G. W. GODDARD,
JOHN N. CARROLL.